Nov. 21, 1967   J. H. HEYWOOD   3,353,853
TUBE CONNECTING FASTENER
Filed May 3, 1965   2 Sheets-Sheet 1
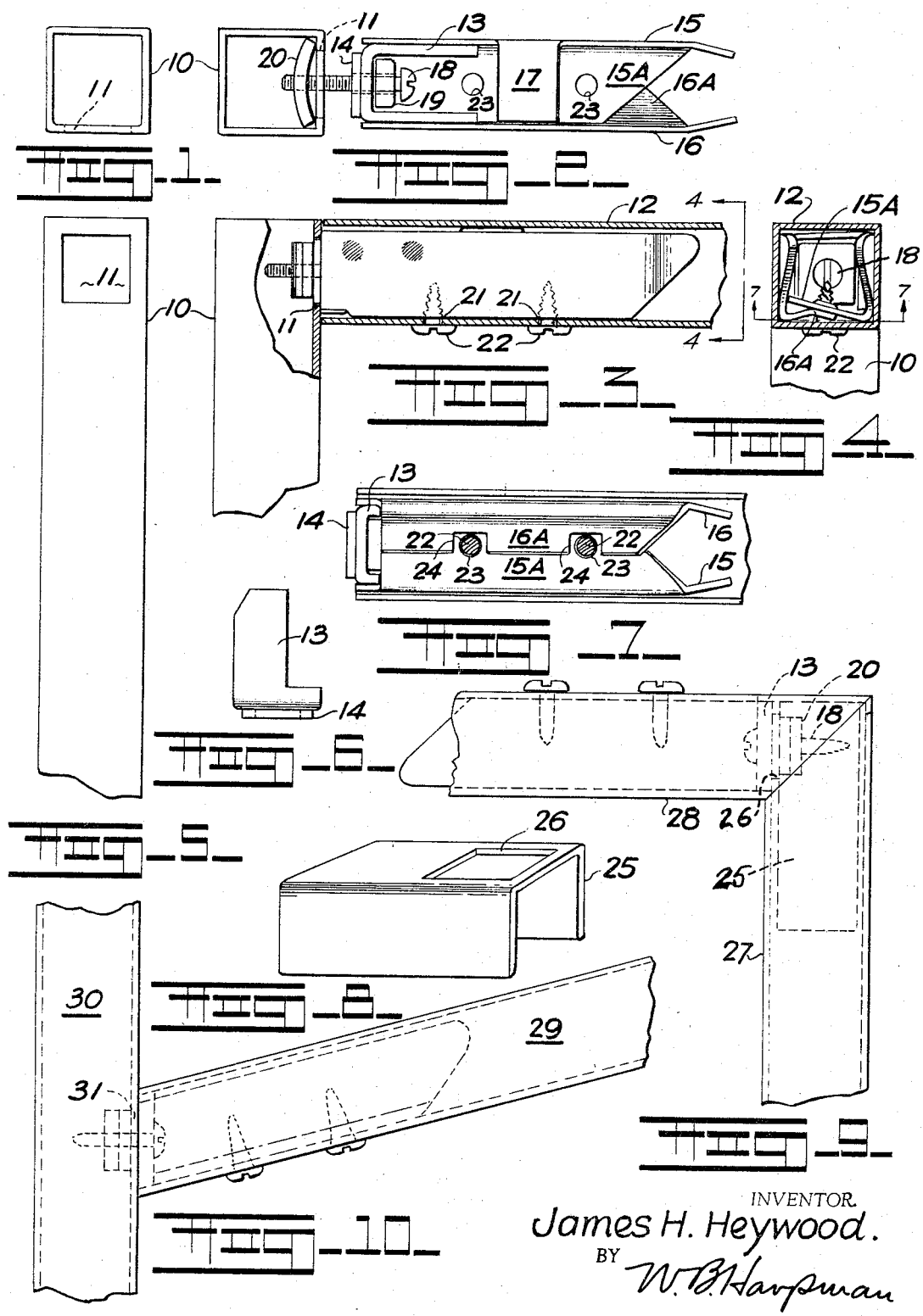
INVENTOR.
James H. Heywood.
ATTORNEY.

Nov. 21, 1967     J. H. HEYWOOD     3,353,853
TUBE CONNECTING FASTENER
Filed May 3, 1965
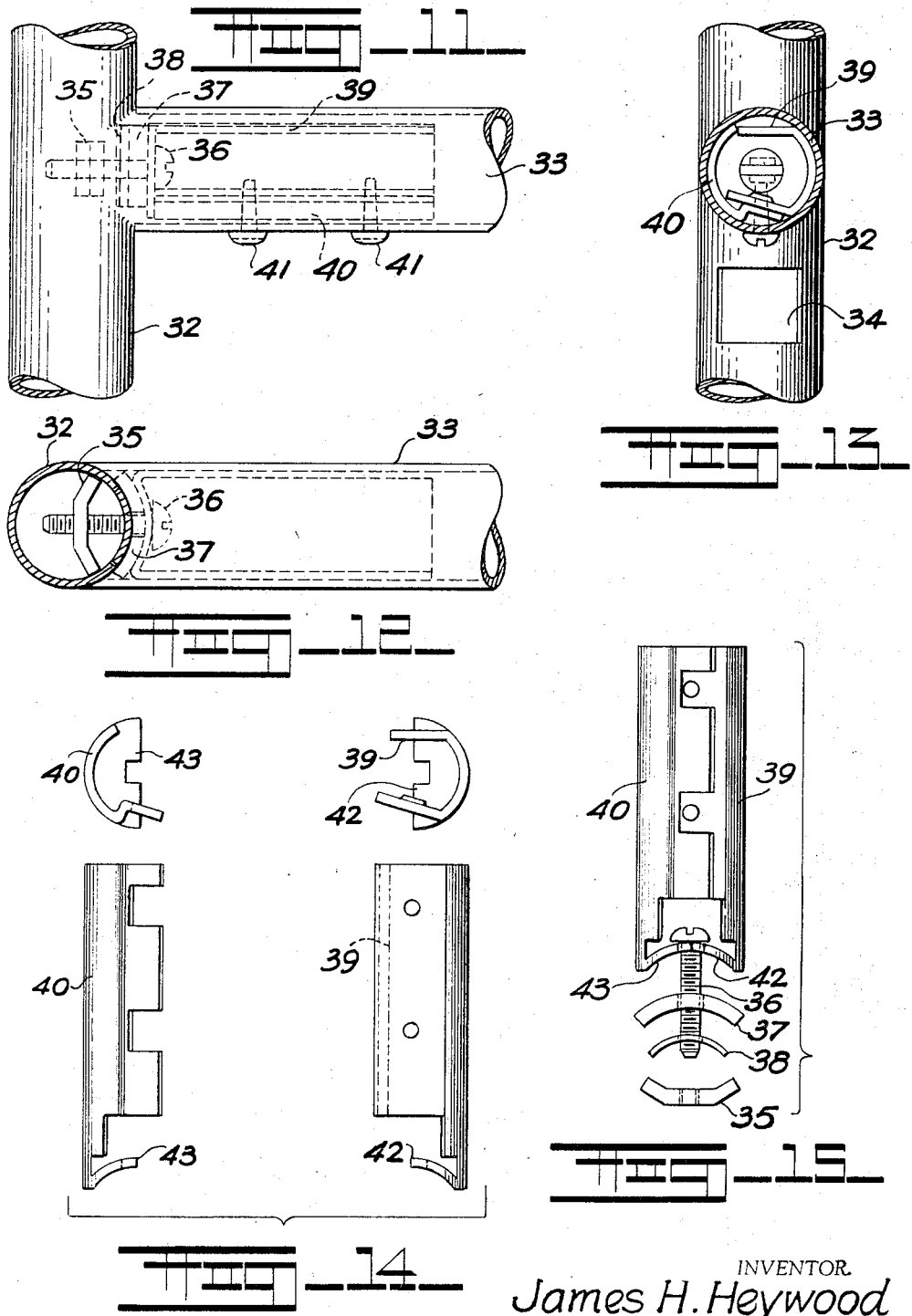

United States Patent Office 3,353,853
Patented Nov. 21, 1967

3,353,853
TUBE CONNECTING FASTENER
James H. Heywood, 1411 Doncaster,
Youngstown, Ohio 44511
Filed May 3, 1965, Ser. No. 452,704
4 Claims. (Cl. 287—54)

ABSTRACT OF THE DISCLOSURE

A tube connecting fastener having expandable members engageable in one tube and an attached movable fixed complementary fastener in another tube.

---

This application is a continuation-in-part of application, Ser. No. 338,455, filed Jan. 17, 1964, on "Corner Fastener for Aluminum Extrusions," and now Patent No. 3,275,356.

This invention relates to tube connecting fasteners for joining the ends of tubular metal shapes and the like to one another or for joining an end of one tubular shape to the side of another of like configuration.

The principal object of the invention is the provision of a simple, inexpensive tube connecting fastener arranged to hold one piece of tubing with its end in abutting relation to the side of another piece of tubing of similar configuration and wherein practically all of the fastener and fastening means are hidden within the pieces of tubing being joined.

A still further object of the invention is the provision of a tube connecting fastener that will economically and advantageously replace welded tubular fastenings as commonly used in metal furniture and the like.

A still further object of the invention is the provision of a tube connecting fastener which is usable in exposed metal furniture sections where it is hidden and wherein it saves most of the time heretofore believed necessary in welding such tubular metal sections of metal furniture to one another, and additionally saves more than half the cost heretofore believed necessary in forming welded tubular assemblies as used in metal furniture, such as chairs and the like.

A still further object of the invention is the provision of a tube connecting fastener that may be easily and quickly installed in an aperture in the side wall of one section of metal tubing, and secured in position to receive the end of another section of metal tubing brought into abutment with the first section in covering relation to the fastener and the aperture therein.

The tube connecting fastener disclosed herein is particularly adapted for joining sections of square metal tubing such as used in metal furniture including chairs and the like in inexpensive rapid manner and completely eliminating the heretofore believed necessary task of positioning the metal sections in a fixture or jig, welding them to one another, buffing or grinding off the welds and then plating or refinishing the welded metal section and subsequently straightening it to overcome the twisting and bending occuring from the temperature changes due to welding.

Metal furniture, including metal chairs, metal sofas, and other metal furniture items, have for a number of years been formed of tubular members welded to one another to form the side, back and seat carrying frames. Such constructions have heretofore been welded with the hereinbefore noted high cost due to the amount of time and labor necessary to refinish the welded joints and straighten the welded tubing so that they could then be painted or enameled or plated, as the case may be, as desired in the finished metal furniture. A typical metal chair, as commonly formed in industry, includes a pair of side sections, each of which has a front leg and back leg with the back leg being extended vertically a sufficient height to carry the upholstered or other backrest of the chair. One or more interconnecting cross members are provided between the front and back legs intermediate their upper and lower ends, and an additional cross member is used to connect the top of the front leg member to the back leg member, and which member becomes the arm rest, or, alternately, supports a bolted-on arm rest, upholstered or unupholstered as the case may be. A pair of these so-called side frames are then positioned in spaced relation and at least two cross members are welded thereto to carry the seat cushion or the like. Additionally, two cross members are welded between the upper ends of the back legs to form a rectangle for supporting the back cushion or support as desired. Thus, a typical metal office chair formed of cross sectionally square metal tubing usually incorporates up to sixteen welded joints, most of which are between one end of a section of metal tubing and a side of another section of metal tubing, and some of which are between the ends of two sections of metal tubing arranged at right angles to one another.

The present invention relates to a tube connecting fastener which may be utilized for each of these up to sixteen welded joints heretofore believed necessary in tubular metal chair constructions, and wherein the total time involved is reduced by approximately three-quarters that necessary for the welding, grinding, buffing and refinishing and straightening of the welded sections and wherein the cost of the tube connecting fasteners used is less than one-half the cost of the welding procedure and the other steps necessary when the same are used.

The present invention therefore makes possible the fabrication of metal furniture and the like from metal tubing of various cross sectional shapes with a minimum of expense and time, and thus permits better and less expensive tubular metal furniture to be produced and distributed to the consumer.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a top plan view of a cross sectionally square tubular member.

FIGURE 2 is a top plan view of the cross sectionally square tubular member seen in FIGURE 1 with the same turned a quarter turn and showing a tube connecting fastener loosely positioned in an aperture in the side thereof.

FIGURE 3 illustrates a side view of the cross sectionally square tubular member and fastener seen in FIGURE 2, together with parts broken away and parts in cross section indicating the end section of another cross sectionally square tubular member engaged on the tube connecting fastener.

FIGURE 4 is an end view on line 4—4 of FIGURE 3.

FIGURE 5 is a side view of the cross sectionally square tubular member seen in FIGURE 1 of the drawings.

FIGURE 6 is a detailed side elevational view of a portion of the tube connecting fastener seen in FIGURE 2 of the drawings.

FIGURE 7 is a vertical section on line 7—7 of FIGURE 4, showing the opposite side of the tube connecting fastener with respect to that illustrated in FIGURE 2.

FIGURE 8 is a perspective view of a section of apertured channel.

FIGURE 9 is a side elevation of a pair of tubular members having diagonal end configurations joined to one another and incorporating the apertured channel seen in FIGURE 8.

FIGURE 10 is a side elevation of a pair of tubular members one of which has a diagonal end configuration joined to the apertured side wall of the other tubular member.

FIGURE 11 is a side elevation of a pair of cross sectionally round tubular members joined by the tube connecting fastener modified to fit cross sectionally round members.

FIGURE 12 is a top plan view of the tubular members seen in FIGURE 11.

FIGURE 13 is a side view of the tubular members seen in FIGURES 11 and 12 with an extra aperture therein to which another tubular member may be joined.

FIGURE 14 is a composite view showing the side and end elevations of the two expansible portions of the tube connecting fastener seen in FIGURES 11, 12 and 13.

FIGURE 15 is a side view of the assembled tube connecting fastener seen in FIGURES 11, 12 and 13.

By referring to the drawings, and FIGURES 1, 2, 3 and 5, it will be observed that a vertically standing section of cross sectionally square metal tubing 10 is disclosed with a square aperture 11 in one side thereof adjacent the upper end thereof. A second section of cross sectionally square metal tubing 12 is seen in FIGURES 3 and 4 of the drawings, and it will be observed that it is of the same cross sectional shape as the metal tubing 10 and that it is shown in FIGURES 3 and 4 of the drawing with its square cut end in abutting relation to the side of the metal tubing 10 surrounding the aperture 11 therein.

By referring now to FIGURE 2 of the drawings, it will be seen that the second section of metal tubing 12 can be engaged upon the metal tubing 10 and secured thereto and held rigidly in position relative thereto by means of a tube connecting fastener comprising the following parts: a U-shaped member 13, the web or base portion of which is apertured and provided with a projecting square shoulder 14 which may be formed integrally therewith or preferably as a separate section secured thereto; a pair of oppositely disposed L-shaped expansion members 15 and 16 are secured by their oppositely disposed flanges adjacent their respective inner end portions to the arms of the U-shaped member 13 heretofore referred to as by spot welding. Thus, in effect, the U-shaped member 13 has a pair of cross sectionally L-shaped members extending outwardly therefrom as best seen in FIGURE 2 of the drawings, and these L-shaped members 15 and 16 are capable of movement relative to one another in an expanding action as hereinafter described. The L-shaped member 15, as seen in FIGURE 2 of the drawings, has a depending flange 15A extending continuously on the backside thereof as seen in FIGURE 2 and it has a relatively narrow front tab 17 on its front edge which extends downwardly into loose engagement with the horizontal flange of the L-shaped member 16. The vertical flange of the L-shaped member 16 is indicated at 16A and extends upwardly behind the vertical flange 15A.

In order that the parts just described may be secured to the square tubing 10 by way of the aperture 11 therein, a bolt 18 is engaged through a spacing member and through the aperture in the base or web portion of the U-shaped member 13 through a matching or registering aperture in the squared shoulder 14 thereof and extends outwardly and into the squared opening 11 in the tubular member 10 where it threadably engages an arcuate nut 20. The arcuate nut 20 is narrower than it is wide, as may be seen by referring to FIGURE 3 of the drawings and comparing the showing with FIGURE 2, so that it can be inserted in an angular direction through the square opening 11 and then moved to the position seen in FIGURE 2 of the drawing where it spans the squared opening 11 and where its ends loosely engage the opposite side walls of the square tubing 10.

When a screwdriver is used to rotate the bolt 18, the fastener assembly will move into abutting relation against the side of the cross sectionally square tube 10 as shown in FIGURE 3 of the drawings, and the arrangement is such that the squared shoulder portion 14 registers with the squared opening 11 so that the fastener is securely and immovably held relative to the square tubing 10 and in projecting relation from the side thereof. The cross sectionally square tube 12 is then engaged over the tube connecting fastener and specifically the flanges 15 and 16 thereof which are of an overall size slightly smaller than the inner dimension of the square tube 12. A pair of apertures 21 are formed in the square tube 12, preferably in the bottom thereof where they will not be seen in the finished furniture article, and metal screws 22 are engaged in the fastener through the apertures 21 engaging apertures 23 in the flange 15A which, it will be observed, is the inner one of the two flanges, the other being the flange 16A, relative to the metal screws 22 as best seen in FIGURE 4 of the drawings. When the metal screws 22 are tightened, they move the flange 15A downwardly, as seen in FIGURE 4 of the drawings, thereby distorting both the flange members 16 and 15 and causing them to expand relative to one another. It will be seen that this is possible because the adjacent edge portion of the flange 16A relative to the metal screws 22 is cut away as best seen in FIGURE 7 of the drawings, wherein the cutaway areas are indicated by the numeral 24.

The expanding action of the flange members 15 and 16 is the same as that occurring in the corner fastener for aluminum extrusions as disclosed in my co-pending application, Ser. No. 338,455 and now Patent No. 3,275,356 of which this application is a continuation-in-part.

It will thus be seen that two sections of cross sectionally square metal tubing may be joined in a desired manner forming a tight, rigid, good looking, inexpensive joint through the use of the tube connecting fastener disclosed herein.

It will occur to those skilled in the art that the same fastener may be used in joining the mitered ends of cross sectionally square tubing to one another, and by referring to FIGURES 8 and 9 of the drawings the manner in which this is accomplished may be seen.

In FIGURES 8 of the drawings, a section of channel 25 will be seen to be provided with a square opening 26 in one side thereof. This section of channel is spotwelded or otherwise tightly secured in the mitered end of a cross sectionally square section of tubing 27 as seen in FIGURE 9, and a similar mitered end section of cross sectionally square tubing 28 is positioned over the tube connecting fastener which is exactly the same as heretofore described in connection with FIGURES 2, 3, 4 and 7 of the drawings.

It will be observed that the U-shaped member 13 is present with its oppositely disposed outwardly extending, flanged portions 15 and 16, and that the arcuate nut 20 is engaged upon the bolt 18 after it has been positioned through the square opening 26 in the section of channel 25 which is positioned in the ends of the tubing 27 so that the opening 26 is in the portion of the channel 25 which extends out of the mitered end of the tube 27.

A similar arrangement may be used for securing a section of cross sectionally square metal tubing to the side of another section of tubing with the first section at an angle other than a right angle as seen in FIGURE 10 of the drawings wherein a first section of metal tubing 29 has its end cut on an angle and abutted against the side of a second section of metal tubing 30 which in turn is provided with a squared opening 31 in the side to which the section 29 is abutted. The same fastening member with the U-shaped member 13 and its flanged portions bent at other than right angles thereto is then assembled into the sections of tubing 29 and 30 exactly as in the arrangement shown and described in connection with FIGURES 1, 2, 3 and 4 and 7 of the drawings heretofore disclosed, and it will occur to those skilled in the art that the relative position of the joining tubular member 29 may be any position desired so long as the base or web portion of the member 13 of the fastener is positioned at the same angle as the end of the tubing in which the expanding portion of the fastener is positioned.

It will also occur to those skilled in the art that the same fastener may be modified slightly to be usable in cross sectionally round tubing which is frequently used in metal furniture, racks or other articles and by referring to FIGURES 11, 12 and 13 of the drawings a typical example of such a modification and use may be seen. In FIGURES 11, 12 and 13 a vertical tubular section which is cross sectionally round is indicated by the numeral 32, and a section of cross sectionally round tubing 33 to be joined to one side of the tubing 32 is also illustrated, and it will occur to those skilled in the art that the end of the section of tubing 33 which will abut the side of the tubing 32 must be cut on an arc of the same diameter as the outer diameter of the tubing 32. This is shown in FIGURE 12 of the drawings. A squared aperture such as seen at 34 in FIGURE 13 is formed at the point where the tubing 33 is to be joined, and a fastener formed in exactly the same manner as the fastener seen and described in FIGURES 2, 3, 4 and 7 herein is then attached to the cross sectionally round tubing 32 by inserting the arcuate nut 35 which is engaged on a bolt 36 positioned through a U-shaped member 37 having a squared shoulder portion 38 and outwardly extending flange sections 39 and 40.

The bolt 36 is tightened to firmly attach the tube connecting fastener to the side of the tubing 32 and the section of tubing 33 with its end cut on a concave arc is then pushed over the fastener and metal screws 41 are inserted through the flanges of the members 39 and 40 as best seen in FIGURE 13 of the drawings to create the clamping expanding action exactly the same as in the form of the invention heretofore described.

It will thus be seen that when the metal screws 41 are tightened, the flanges will move in expanding action and which action will be secured by the positioning of the metal screws 41, which are the only parts of the fastener which then show in the finished joint. FIGURE 14 shows the altered expanding flange members 39 and 40 in exploded relation, and FIGURE 15 shows the fastener in assembly. In FIGURE 15, it will be seen that the flange members 39 and 40 are so formed that their end sections 42 and 43 form the web of the U-shaped which was formed as an individual member 13 in the other form of the invention as described and seen in FIGURES 2, 3, 4 and 7 of the drawings, for example; and that the bolt 36 serves to hold the assembly including an apertured member 37, the shoulder portion 38 which in assembly and in closely positioned relation to the end configurations 42 and 43 form the U-shaped member which is the equivalent of the part 13 as seen and described in FIGURES 2, 3, 4 and 7 of the drawings heretofore.

It will thus be seen that a tube connecting fastener has been disclosed which may be easily fabricated and inexpensively and quickly installed for the indicated purpose, and it will occur to those skilled in the art that the cross sectional configuration of the tubing is a matter of choice and that the device may be altered by changing the shape and configuration of its respective parts to fit any cross sectional configuration of metal tubing that may be desired.

It will thus be seen that the tube connecting fastener described herein meets the several objects of the invention, and having thus described my invention, what I claim is:

1. A tube connecting fastener for securing hollow metal tubes to one another in right angular relation and comprising a U-shaped body member having a base portion and spaced arm portions, said base portion having a projecting shoulder of desirable configuration on the base thereof and said arm portion having a pair of oppositely disposed, longitudinally extending expansion members secured thereto in spaced relation so as to extend outwardly therebeyond, said members each having a longitudinal flange thereon one of said expansion members having a tab on a side opposite to said flange and extending outwardly a distance equal to the distance of said flange and adapted to loosely engage the flange of the other of said expansion members to hold the same in spaced relation, one of said expansion members has a flange of greater width than the space between said expansion members and is disposed at an angle thereto and is movable toward the flange on the other of said expansion members to move said flanges apart said flanges being apertured to receive metal screws for distorting said flanges to increase the effective spacing thereof when inserted in one of said metal tubes, a bolt positioned through the base of said U-shaped body member and extending in a direction opposite to said expansion members and an arcuate nut on said bolt of a configuration enabling it to be positioned through a shaped aperture in the other one of the hollow metal tubes said nut having outer dimensions greater than said aperture.

2. The tube connecting fastener set forth in claim 1 and wherein the shaped aperture is square and wherein the projecting shoulder is square for registry in said aperture.

3. The tube connecting fastener set forth in claim 1 and wherein said tubes have mitered ends to be joined, and wherein said shaped aperture is positioned in an extension of one wall of said other hollow metal tube.

4. A tube connecting fastener for securing the end of one tube against the side of a second tube having a square aperture therein, said fastener comprising a composite member including a projecting apertured squared shoulder at one end and a pair of spaced oppositely extending sections, flanges on said sections overlying one another and having registering apertures and cutaway areas, one of said flanged sections has a flange of greater width than the space between said flanged sections and is disposed at an angle thereto and is movable toward the flange on the other of said flanged sections to move said flanges apart a bolt positioned through said projecting squared shoulder and a nut engaged on said bolt and positioned within said tube having said square aperture therein, said nut having outer dimensions greater than said aperture said squared shoulder registering in said square aperture in non-rotative relation thereto, said first mentioned tube positioned over said sections and metal screws positioned therethrough in registry with said registering apertures and cutaway areas in said flanges and arranged to move said flanges into clamping relation within said first-mentioned tube.

References Cited

UNITED STATES PATENTS

| 2,497,396 | 2/1950 | Crampton | 151—68 |
| 2,855,255 | 10/1958 | Sonderstrup | 287—54 |
| 2,941,855 | 6/1960 | Weill | 287—54 |
| 2,972,495 | 2/1961 | Yalen | 287—54 |

FOREIGN PATENTS

| 586,689 | 11/1959 | Canada. |
| 1,184,688 | 2/1959 | France. |

EDWARD C. ALLEN, *Primary Examiner.*

THOMAS F. CALLAGHAN, *Examiner.*

UNITED STATES PATENT OFFICE
CERTIFICATE OF CORRECTION

Patent No. 3,353,853                                      November 21, 1967

James H. Heywood

It is hereby certified that error appears in the above numbered patent requiring correction and that the said Letters Patent should read as corrected below.

Column 1, line 12, strike out "Fastener for Aluminum Extrusions," and now Patent No." and insert instead -- fastener extending outwardly therefrom and engaging a --.

Signed and sealed this 10th day of December 1968.

(SEAL)
Attest:

Edward M. Fletcher, Jr.                                          EDWARD J. BRENNER
Attesting Officer                                                    Commissioner of Patents